(12) United States Patent
Wang et al.

(10) Patent No.: US 6,859,424 B2
(45) Date of Patent: Feb. 22, 2005

(54) TRACK COUNT METHOD FOR AN OPTICAL DISC IN AN OPTICAL DISC SYSTEM

(75) Inventors: Shung-Yunn Wang, Hsin-Chu Hsien (TW); Hao-Cheng Chen, Taipei Hsien (TW)

(73) Assignee: Mediatek Incorporation, Hsin-Chu (TW)

( * ) Notice: Subject to any disclaimer, the term of this patent is extended or adjusted under 35 U.S.C. 154(b) by 136 days.

(21) Appl. No.: 10/065,659

(22) Filed: Nov. 7, 2002

(65) Prior Publication Data

US 2004/0052171 A1 Mar. 18, 2004

(30) Foreign Application Priority Data

Sep. 13, 2002 (TW) ........................................ 91121069 A

(51) Int. Cl.⁷ ................................................ G11B 7/00
(52) U.S. Cl. ................................ 369/44.28; 369/124.15
(58) Field of Search .......................... 369/44.25, 44.27, 369/44.28, 53.23, 53.28, 53.29, 53.37, 124.15

(56) References Cited

U.S. PATENT DOCUMENTS

| | | | | |
|---|---|---|---|---|
| 5,199,017 A | * | 3/1993 | Kagami et al. .......... | 369/44.28 |
| 5,289,447 A | * | 2/1994 | Kobayashi et al. ...... | 369/44.28 |
| 5,426,625 A | * | 6/1995 | Bui et al. ................ | 369/44.32 |
| 5,457,671 A | * | 10/1995 | Takata et al. ........... | 369/44.28 |
| 5,475,663 A | * | 12/1995 | Ogino ..................... | 369/44.28 |

* cited by examiner

Primary Examiner—Paul W. Huber
(74) Attorney, Agent, or Firm—Winston Hsu

(57) ABSTRACT

A method for counting a number of tracks of an optical disc in an optical disc system. The optical disc system includes an optical pickup, a light source, and a plurality of optical sensors. The method includes emitting a light beam to the optical disc from the light source, detecting light reflected from the optical disc by the optical sensors, and generating a tracking error signal according to detected signals of the optical sensors while the optical pickup moves along a radial direction of the optical disc. The method further includes generating a tracking error zero crossing signal according to the tracking error signal, generating a peak detecting signal according to the tracking error signal, generating a pseudo radio frequency zero crossing signal according to the peak detecting signal, and generating a track count signal according to the pseudo frequency crossing signal.

10 Claims, 5 Drawing Sheets

| Moving direction of the optical pickup | Location | Initial level of the PD signal |
|---|---|---|
| Radial inward | Land | PD (0) =0 |
| | Groove | PD (0) =1 |
| Radial outward | Land | PD (0) =1 |
| | Groove | PD (0) =0 |

Fig. 5

TRACK COUNT METHOD FOR AN OPTICAL DISC IN AN OPTICAL DISC SYSTEM

BACKGROUND OF INVENTION

1. Field of the Invention

The present invention relates to a track count method for an optical disc in an optical disc system, and more particularly, to a track count method which generates track count signals based on generating a pseudo radio frequency zero crossing signal.

2. Description of the Prior Art

Before an optical pickup starts to read/record data from/to a compact disc or a digital versatile disc (DVD), it has to move to a target track of the compact disc or the DVD. When the optical pickup searches for the target track it crosses other tracks. The distance between the present location of the optical pickup and the target track can roughly be divided into two possible situations, short-term track crossing(short seek) and long-term track crossing(long seek). In both of these situations, the relative speed and direction between the optical pickup and the optical disc are important factors when an optical disc system controls the optical pickup to cross tracks. Only when the optical system has confirmed the moving direction of the optical pickup, can it accurately control asled motor to move the optical pickup to the target track so to read/record data from/to the optical disc. While the optical disc system controls the optical pickup to cross tracks, it constantly confirms the moving direction of the optical pickup.

Typical methods of confirming the moving direction of the optical pickup vary according to the speed of the optical pickup when it crosses tracks. When the moving speed of the optical pickup is slow, the optical disc system uses the optical pickup to emit light to a groove or a land of the optical disc for generating a reflected radio frequency ripple signal and a tracking error signal, which depends whether the light is reflected from the target track or not. A phase difference between the radio frequency ripple signal and the tracking error signal is used to determine the moving direction of the optical pickup. A DVD-RAM disc stores data on both grooves and lands to increase a capacity for data. Therefore, as shown in FIG. 1, a frequency of the radio frequency ripple(RFRP) signal of a data area is twice that of a blank area. This results in a substantial amount of noise, so that it is difficult to select a correct radio frequency zero crossing signal. As a result, the optical disc system cannot function well relying on the optical pickup, which cannot read the track cross signals accurately.

SUMMARY OF INVENTION

It is therefore a primary objective of the claimed invention to provide a track count method for an optical disc in an optical disc system to solve the above-mentioned problem.

According to the claimed invention, the optical disc system comprises an optical pickup that is moveable along a radial direction of the optical disc, a light source installed on the optical pickup for emitting light, and a plurality of sensors installed on the optical pickup for detecting light reflected from the optical disc. The method comprises using the light source to emit light towards the optical disc, using the sensors to detect light reflected from the optical disc, and generating a tracking error (TE) signal based on the light received by the sensors while the optical pickup moves along a radial direction of the optical disc. The method further comprises generating a tracking error zero crossing (TEZC) signal based on the TE signal, generating a peak detecting (PD) signal based on the TE signal, generating a pseudo radio frequency zero crossing (RFZC) signal based on the PD signal, and generating a track count signal based on the TEZC signal and the pseudo RFZC signal.

It is an advantage of the claimed invention that the track count method for an optical disc in an optical disc system can generate the pseudo RFZC signal with better quality than the radio frequency ripple signal used in the prior art so that the optical disc system reads/records data from/to the optical disc more accurately by using the signal with better quality.

These and other objectives of the present invention will no doubt become obvious to those of ordinary skill in the art after reading the following detailed description of the preferred embodiment that illustrated in the various figures and drawings.

BRIEF DESCRIPTION OF DRAWINGS

FIG. 5 is a state diagram of initial levels of the peak detecting signal according to the present invention.

DETAILED DESCRIPTION

Figure 1:
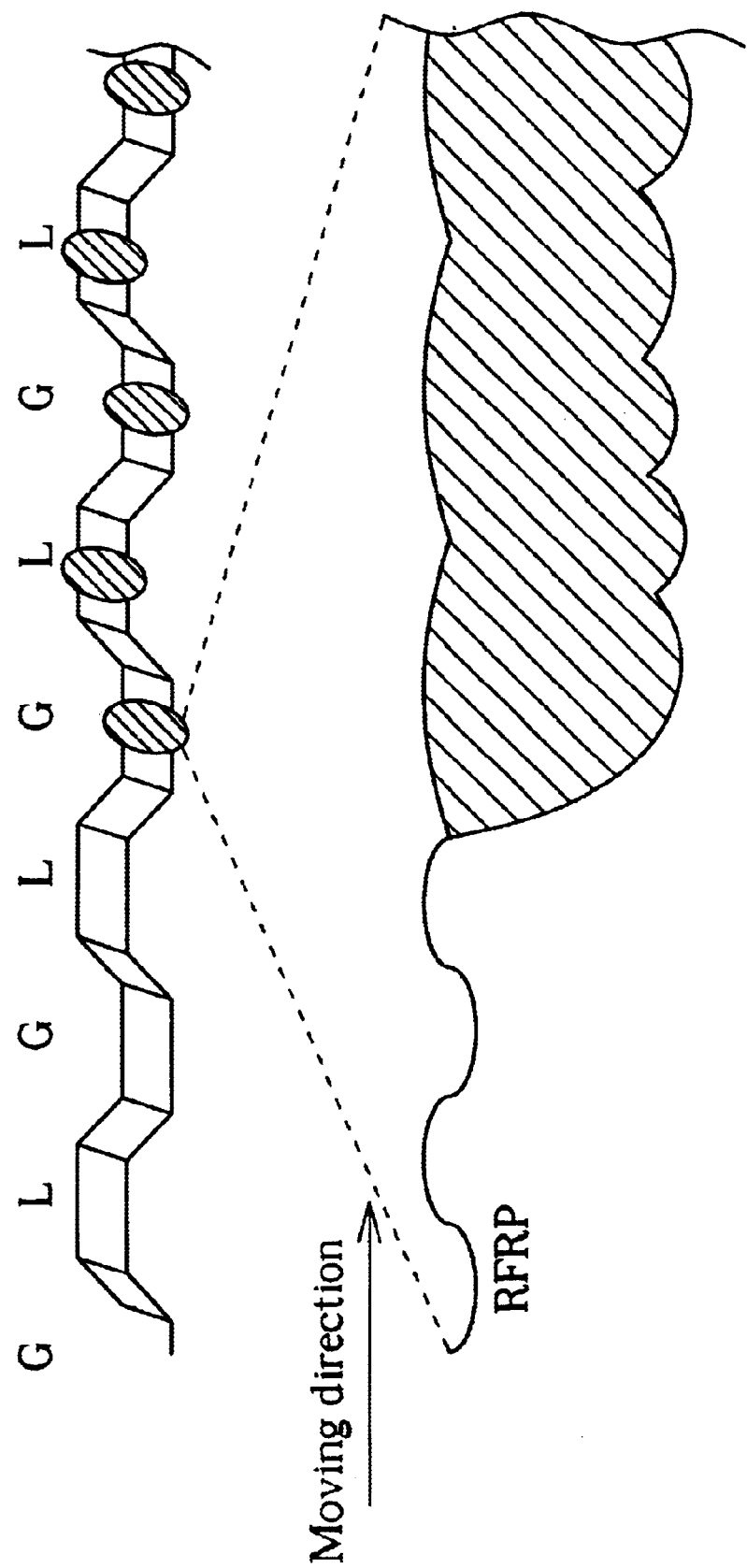
FIG. 1 is a diagram of a conventional radio frequency ripple signal.

The method of arranging data units upon a digital versatile disc-random access memory (DVD-RAM) is different from that of a digital versatile disc (DVD). To increase the capacity for data, the DVD-RAM stores data on both grooves and lands. Based on this difference, the method of controlling an optical pickup for the DVD-RAM is also different from that of the DVD. For the DVD-RAM, a tracking error signal is generated by a differential push pull (DPP), and the optical pickup has to cross a groove and a land for generating a circle of tracking error signals so that it can be more easily controlled during searching. However, the frequency of the radio frequency ripple signal generated by the data area is twice that generated by the blank area because the DVD-RAM stores data on both grooves and lands. As shown in FIG. 1, the radio frequency ripple signal has significant noise, so that it is difficult to select a proper radio frequency zero crossing (RFZC) signal. Therefore, the present invention provides a method of generating a pseudo radio frequency zero crossing (pseudo RFZC) signal to solve this problem.

Figure 2:
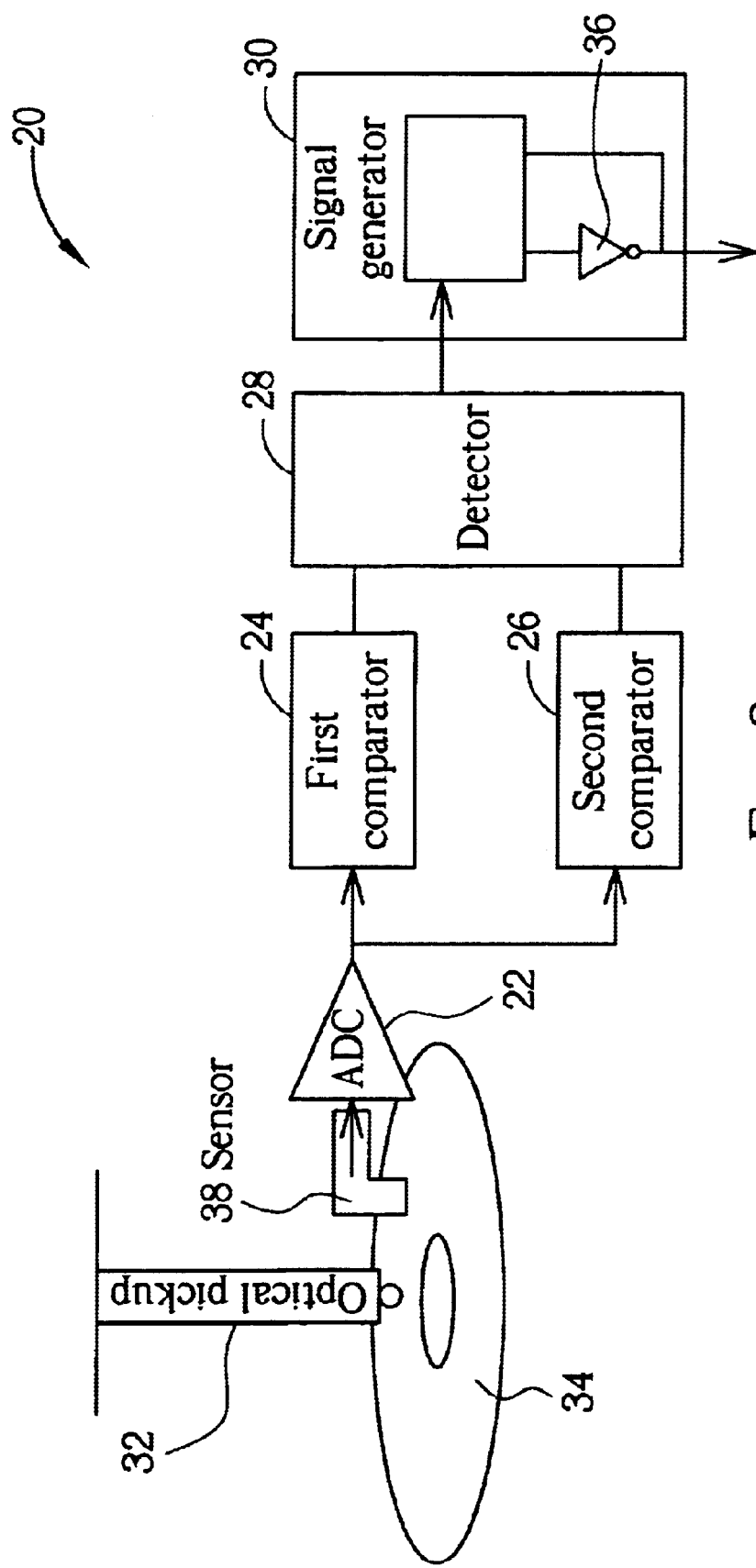
FIG. 2 is a schematic diagram of a present invention optical disc system.

Please refer to FIG. 2. FIG. 2 is a diagram of a present invention optical disc system 20. The optical disc system 20 comprises an optical pickup 32 for reading data from an optical disc 34 and recording data to the optical disc 34, and a plurality of sensors 38 for detecting light reflected from the optical disc 34. The light received by the sensor 38 is used to generate a tracking error signal. The optical disc system 20 further comprises an A/D (analog to digital) converter 22 for converting the tracking error signal into a series of digital signals, a first comparator 24 connected to the A/D converter 22 that allows those digital signals greater than a first threshold to pass through, and a second comparator 26 connected to the A/D converter 22 that allows those digital signals lower than a second threshold to pass through. The optical disc system 20 further comprises a detector 28 connected to the first comparator 24 and the second comparator 26 for detecting local maximums and local minimums of the tracking error signal according to the digital signals that pass through the first comparator 24 or the second comparator 26. More specifically, the detector 28 uses the digital signals, which pass through the first or second comparator 24, 26, to calculate a plurality of local average values each being an average of a plurality of consecutive digital signals, which pass through the first or second comparator 24, 26, and compares the local average values to determine the local maximums and local minimums of the tracking error signal. The optical disc system 20 further comprises a signal generator 30 connected to the detector 28 for generating a peak detecting signal according to the local maximums and local minimums of the tracking error signal, and for generating a pseudo RFZC signal according to the moving direction of the optical pickup 32.

Figure 3:
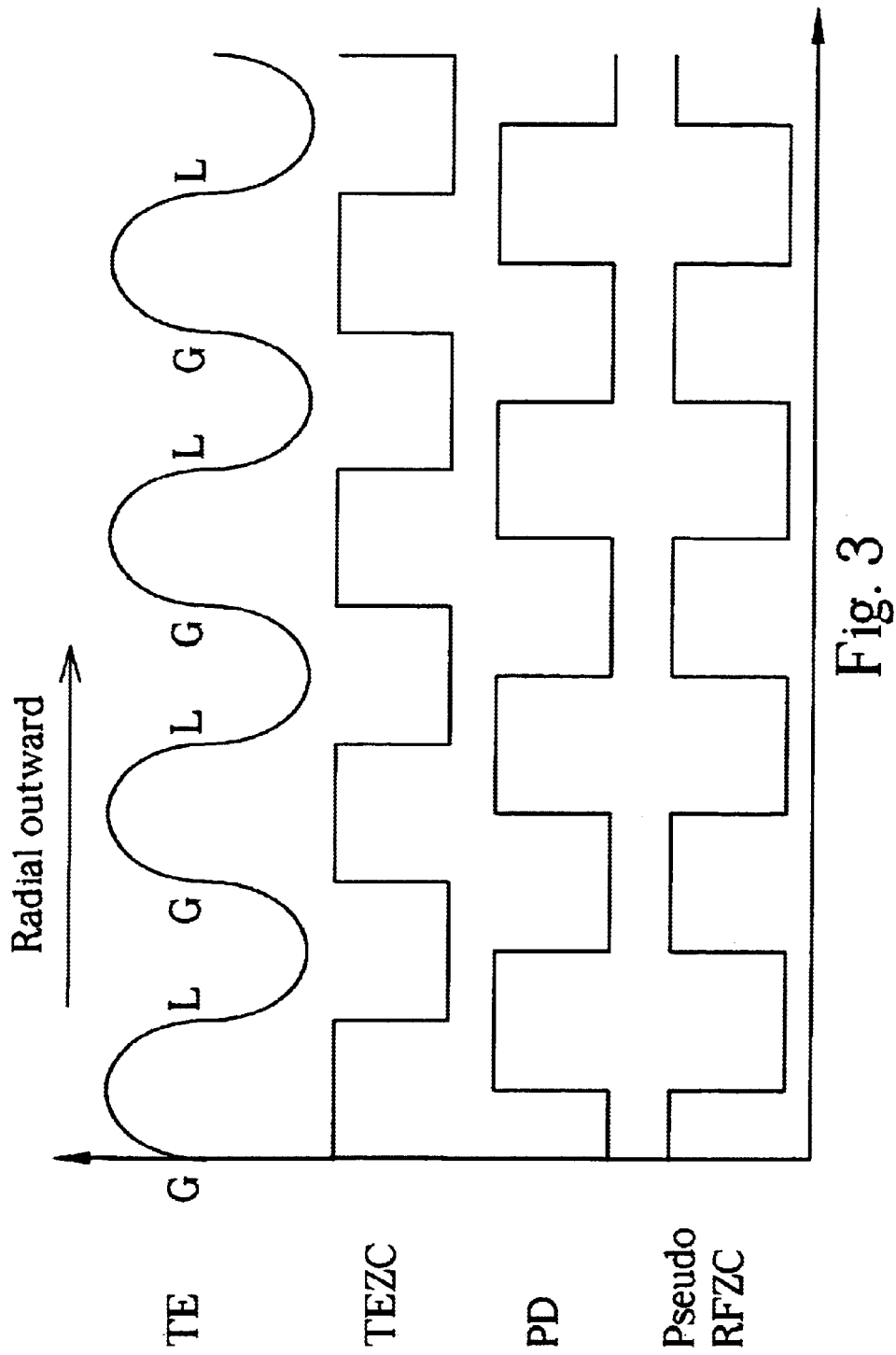
FIG. 3 is a diagram of a relation between inner signals of the optical disc system of FIG. 2 when the optical pickup moves away from the center of the optical disc.
Figure 4:
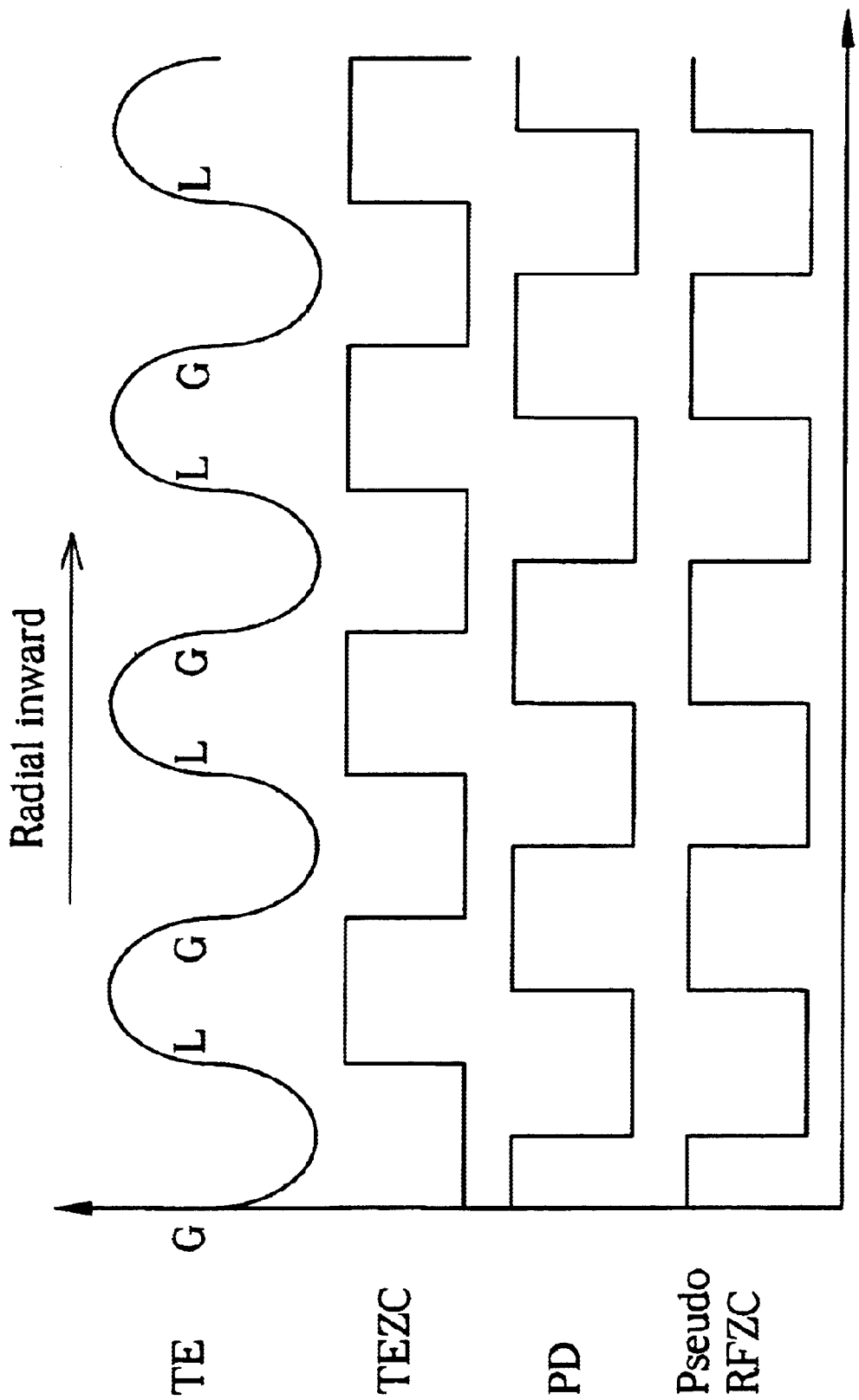
FIG. 4 is a diagram of a relation between inner signals of the optical disc system of FIG. 2 when the optical pickup moves towards the center of the optical disc.

As shown in FIG. 2, when the optical pickup 32 performs searching, it generates the tracking error signal TE, then the A/D converter 32 converts the tracking error signal into a series of digital signals, and selects the tracking error zero crossing signal TEZC. The digital signals that are greater than a first threshold pass through the first comparator 24, and the digital signals that are lower than the second threshold pass through the second comparator 26. Then the detector 28 detects local maximums and local minimums of the tracking error signal TE according to the digital signals, which pass through the first or second comparator 24, 26. Then the signal generator 30 generates the peak detecting signal PD, which has a 90° phase difference from the tracking error zero crossing signal TEZC, according to local maximums and local minimums of the tracking error signal TE. Please refer to FIG. 3 and FIG. 4. FIG. 3 is a diagram of the present invention showing the relation between inner signals of the optical disc system 20 when the optical pickup 32 moves away from the center of the optical disc 34. FIG. 4 is a diagram of the present invention showing the relation between inner signals of the optical disc system 20 when the optical pickup 32 moves towards the center of the optical disc 34. As shown in FIG. 3 and FIG. 4, the peak detecting signal PD is inverted when the tracking error signal TE reaches a local maximum and a local minimum. In addition, an initial level of the peak detecting signal PD is set according to a radial inward or outward moving direction of the optical pickup 32 and depending on a groove or land location of the optical pickup 32 when it starts to read/record data from/to the optical disc 34. Because the peak detecting signal PD is not exactly the RFZC signal, the signal generator 30 has to generate the pseudo RFZC signal according to the peak detecting signal PD and the radial inward or outward moving direction. When the optical pickup 32 moves away from the center of the optical disc 34, the peak signal PD is inverted by an inverter 36 to generate the pseudo RFZC signal. When the optical pickup 32 moves towards the center of the optical disc 34, the signal generator 30 generates the peak detecting signal PD as the pseudo RFZC signal.

Please refer to FIG. 5. FIG. 5 is a state diagram of initial levels of the peak detecting signal PD according to the present invention. As shown in FIG. 5, the initial level of the peak detecting signal is set according to a radial inward or outward moving direction of the optical pickup 32 and a groove or land location of the optical pickup 32 when it starts to read/record data from/to the optical disc 34. When the optical pickup 32 moves towards the center of the optical disc 34 and is located on a land when it starts to read/record data from/to the optical disc 34, the initial level of the peak detecting signal PD is a logical "0". And when the optical pickup 32 is located on a groove when it starts to read/record data from/to the optical disc 34, the initial level of the peak detecting signal is a logical "1". On the contrary, when the optical pickup 32 moves away from the center of the optical disc 34 and is located on a land when it starts to read/record data from/to the optical disc 34, the initial level of the peak detecting signal is a logical "0". And when the optical pickup 32 is located on a groove when it starts to read/record data from/to the optical disc 34, the initial level of the peak detecting signal is a logical "0".

In contrast to the prior art, the present invention generates a pseudo radio frequency zero crossing signal with a better quality than the radio frequency ripple signal used in the prior art, so that it can improve the performance of the optical disc system 20 by using the signal with better quality.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A track count method for an optical disc in an optical disc system, the optical disc system comprising an optical pickup moveable along a radial direction of the optical disc, a light source installed on the optical pickup for emitting light, and a plurality of sensors installed on the optical pickup for detecting light reflected from the optical disc, the method comprising:

using the light source to emit light towards the optical disc;

using the sensors to detect light reflected from the optical disc;

generating a tracking error (TE) signal based on the light received by the sensors while the optical pickup moves along a radial direction of the optical disc;

generating a tracking error zero crossing (TEZC) signal based on the TE signal;

generating a peak detecting (PD) signal based on the TE signal;

generating a pseudo radio frequency zero crossing (RFZC) signal based on the PD signal; and generating a track count signal based on the TEZC signal and the pseudo RFZC signal.

2. The method of claim 1 wherein the TEZC signal is inverted whenever the TE signal is zero.

3. The method of claim 1 wherein the optical disc system further comprises an A/D (analog to digital) converter for converting the TE signal into a series of digital signals, a first comparator connected to the A/D converter which allows digital signals greater than a first threshold to pass through, a second comparator connected to the A/D converter which allows digital signals lower than a second threshold to pass through, a detector connected to the first and second comparators for detecting local maximums and local minimums of the TE signal according to the digital signals which pass through the first or second comparator, and a signal generator connected to the detector for generating the PD signal according to the local maximums and local minimums of the TE signal; the method further comprising:

using the A/D converter to convert the TE signal into the digital signals;

using the first comparator to compare the digital signals with the first threshold so as to allow digital signals greater than the first threshold to pass through;

using the second comparator to compare the digital signals with the second threshold so as to allow digital signals lower than the second threshold to pass through;

using the detector to detect local maximums and local minimums of the TE signal according to the digital signals which pass through the first or second comparator; and using the signal generator to generate the PD signal according to the local maximums and local minimums of the TE signal.

4. The method of claim 3 further comprising:

using the digital signals which pass through the first or second comparator to calculate a plurality of local average values each being an average of a plurality of consecutive digital signals which pass through the first or second comparator; and comparing the local average values to determine the local maximums and local minimums of the TE signal.

5. The method of claim 3 wherein when the optical pickup moves towards a center of the optical disc, the pseudo RFZC signal is in phase with the PD signal;

the optical disc system further comprises an inverter connected to the signal generator; and when the optical pickup moves away from the center of the optical disc, the PD signal is inverted by the inverter to generate the pseudo RFZC signal.

6. The method of claim 3 wherein the PD signal is inverted whenever the TE signal reaches a local maximum or a local minimum.

7. The method of claim 3 further comprising:

setting an initial level of the PD signal according to a radial inward or outward moving direction of the optical pickup.

8. The method of claim 1 wherein data is stored on grooves and lands of the optical disc.

9. The method of claim 8 wherein the optical disc is a DVD (digital versatile disc).

10. The method of claim 9 wherein the optical disc is a DVD-RAM (digital versatile disc random access memory).

* * * * *